(12) United States Patent
Surprise et al.

(10) Patent No.: US 10,943,040 B1
(45) Date of Patent: Mar. 9, 2021

(54) CLOCK GATING LATCH PLACEMENT

(71) Applicant: INTERNATIONAL BUSINESS MACHINES CORPORATION, Armonk, NY (US)

(72) Inventors: Jesse Surprise, Highland, NY (US); Gerald Strevig, III, Cedar Park, TX (US); Shawn Kollesar, Poughkeepsie, NY (US); Adam Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,134

(22) Filed: Sep. 11, 2019

(51) Int. Cl.
*G06F 30/32* (2020.01)
*G06F 30/327* (2020.01)
*G06F 119/12* (2020.01)

(52) U.S. Cl.
CPC ........ *G06F 30/327* (2020.01); *G06F 2119/12* (2020.01)

(58) Field of Classification Search
CPC .................................................... G06F 30/327
USPC ......................................... 716/101, 104, 105
See application file for complete search history.

(56) References Cited

U.S. PATENT DOCUMENTS

| | | | |
|---|---|---|---|
| 6,230,304 B1 | 5/2001 | Groeneveld et al. | |
| 6,440,780 B1 | 8/2002 | Kimura et al. | |
| 6,449,759 B1 | 9/2002 | Whitney et al. | |
| 6,701,507 B1 | 3/2004 | Srinivasan | |
| 6,769,104 B2 | 7/2004 | Rodgers et al. | |
| 7,051,310 B2 | 5/2006 | Tsao et al. | |
| 7,356,785 B2 | 4/2008 | Lu et al. | |
| 7,411,425 B2 * | 8/2008 | Belluomini et al. | H03K 19/0016 326/121 |
| 7,418,641 B2 * | 8/2008 | Drake et al. | G06F 11/1666 714/726 |
| 7,549,137 B2 | 6/2009 | Alpert et al. | |
| 7,551,985 B1 | 6/2009 | Chen et al. | |
| 7,598,774 B2 * | 10/2009 | Belluomini et al. | H03K 19/0016 326/121 |
| 7,624,366 B2 | 11/2009 | Alpert et al. | |
| 7,653,884 B2 | 1/2010 | Furnish et al. | |
| 7,685,552 B2 | 3/2010 | Ishihara et al. | |
| 7,795,943 B2 | 9/2010 | Toyonoh et al. | |
| 7,917,880 B2 | 3/2011 | Mak et al. | |
| 8,010,926 B2 | 8/2011 | Alpert et al. | |

(Continued)

OTHER PUBLICATIONS

Transmittal Form PTO/SB/21 signed Mar. 17, 2020.

(Continued)

*Primary Examiner* — Sun J Lin
(74) *Attorney, Agent, or Firm* — Cantor Colburn LLP; William Kinnaman

(57) ABSTRACT

Methods, systems and computer program products for improved placement of a clock gating latch are provided. Aspects include identifying a clock gating latch that is designated to control a local clock buffer. Aspects also include determining a plurality of data latches that are designated to be controlled by the local clock buffer. Aspects also include determining positions of the plurality of data latches within a layout. Aspects also include determining a position of the clock gating latch within the layout based on the positions of the plurality of data latches within the layout.

20 Claims, 10 Drawing Sheets

(56) References Cited

U.S. PATENT DOCUMENTS

| | | | |
|---|---|---|---|
| 8,104,014 B2 | 1/2012 | Puri et al. | |
| 8,205,182 B1 | 6/2012 | Zlatanovici et al. | |
| 8,490,039 B2* | 7/2013 | Agrawal et al. | G06F 30/327 716/111 |
| 8,495,552 B1* | 7/2013 | Cho et al. | G06F 30/327 716/132 |
| 8,661,374 B2 | 2/2014 | Vishweshwara et al. | |
| 8,661,391 B1 | 2/2014 | Viswanath et al. | |
| 8,667,441 B2 | 3/2014 | Alpert et al. | |
| 8,677,299 B1 | 3/2014 | Alpert et al. | |
| 8,826,211 B1 | 9/2014 | Sood et al. | |
| 8,832,626 B2 | 9/2014 | Agrawal et al. | |
| 8,904,255 B2* | 12/2014 | Tekumalla et al. | G01R 31/318594 702/117 |
| 8,954,912 B2 | 2/2015 | Alpert et al. | |
| 8,966,425 B1 | 2/2015 | Eisenstadt et al. | |
| 9,135,375 B1 | 9/2015 | Sood et al. | |
| 9,411,912 B1 | 8/2016 | Sood et al. | |
| 9,792,398 B2 | 10/2017 | Xu et al. | |
| 10,417,375 B2 | 9/2019 | Chung et al. | |
| 2001/0010090 A1 | 7/2001 | Boyle et al. | |
| 2003/0135836 A1 | 7/2003 | Chang et al. | |
| 2004/0230933 A1 | 11/2004 | Weaver et al. | |
| 2006/0041852 A1 | 2/2006 | Drumm et al. | |
| 2008/0148203 A1 | 6/2008 | Alpert et al. | |
| 2008/0168411 A1 | 7/2008 | Mang et al. | |
| 2008/0276212 A1 | 11/2008 | Albrecht | |
| 2010/0064264 A1 | 3/2010 | Amundson | |
| 2012/0124539 A1 | 5/2012 | Alpert et al. | |
| 2013/0326451 A1 | 12/2013 | Cho et al. | |
| 2014/0070847 A1* | 3/2014 | Elkin et al. | H03K 3/356026 326/98 |
| 2014/0084890 A1* | 3/2014 | Philip et al. | H02M 1/14 323/284 |
| 2016/0188774 A1 | 6/2016 | Adya et al. | |
| 2017/0323030 A1 | 11/2017 | Datta et al. | |

OTHER PUBLICATIONS

Held, S. et al., "Post-Routing Latch Optimization for Timing Closure," Research Institute for Discrete Mathematics, Bonn, Germany, 6 pages.

IBM "List of IBM Patents or Patent Applications Treated as Related; (Appendix P)", Filed Sep. 11, 2019, 2 pages.

Jesse Surprise et al., "Improved Local Clock Buffer Controller Placement and Connectivity," U.S. Appl. No. 16/567,128, filed Sep. 11, 2019.

Jose Neves et al., "Multi-Fanout Latch Placement Optimization for Integrated Circuit (IC) Design," U.S. Appl. No. 16/567,050, filed Sep. 11, 2019.

Jose Neves et al., "Single-Bit Latch Optimization for Integrated Circuit (IC) Design," U.S. Appl. No. 16/567,031, filed Sep. 11, 2019.

Jose Neves et al., "Net Routing for Integrated Circuit (IC) Design," U.S. Appl. No. 16/567,035, filed Sep. 11, 2019.

Jung, J. et al., "Integrated Latch Placement and Cloning for Timing Optimization," ACM Transactions on Design Automation of Electronic Systems, Feb. 2019, vol. 24, No. 2, Article 22, 17 pages.

MacQueen et al., "Some Methods for classification and Analysis of Multivariate Observations," Proceedings of 5th Berkeley Symposium on Mathematical Statistics and Probability, University of California Press, 1967, pp. 281-297.

Papa, D. et al., "Physical Synthesis With Clock-Network Optimization for Large Systems on Chips," IEEE Computer Society, Jul./Aug. 2011, Big Chips, 12 pages.

Viswanathan, "Placement techniques for the physical synthesis of nanometer-scale integrated circuits," Iowa State University, Graduate Theses and Dissertations, 20758, 2009, 160 pages.

* cited by examiner

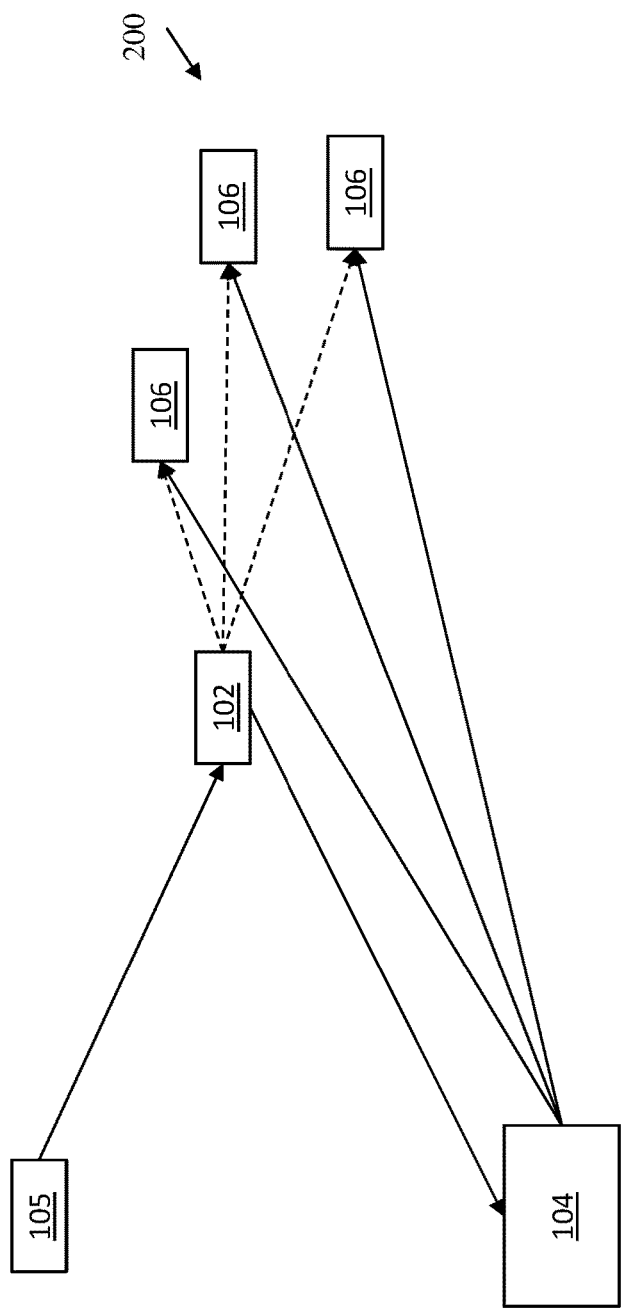
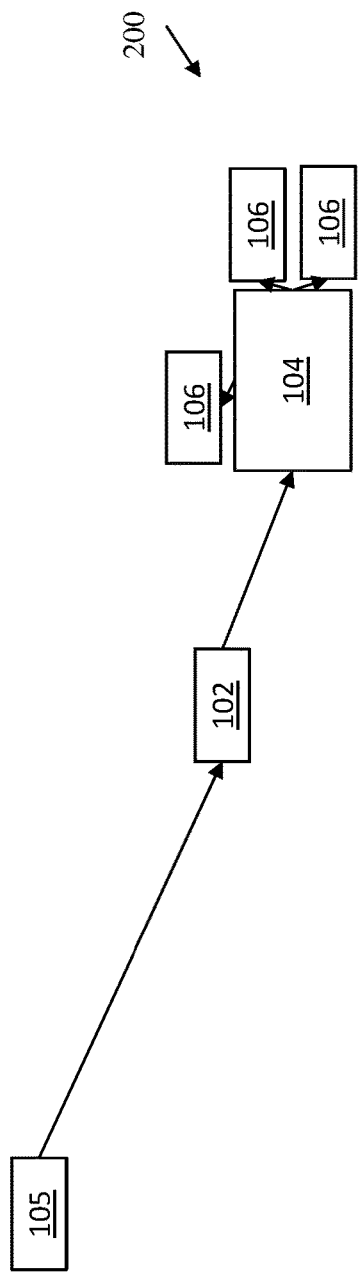
FIG. 2A
FIG. 2B

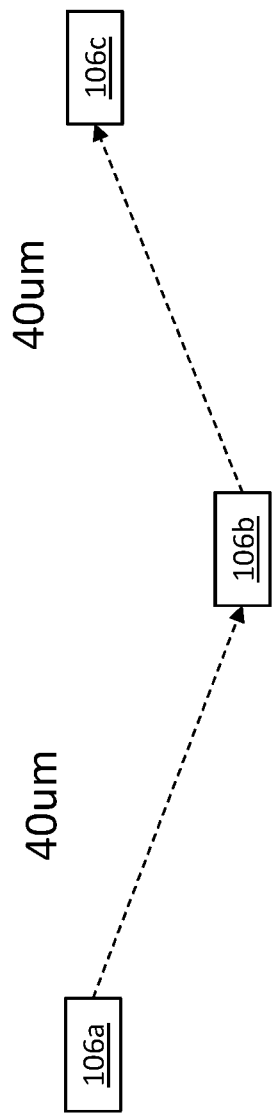
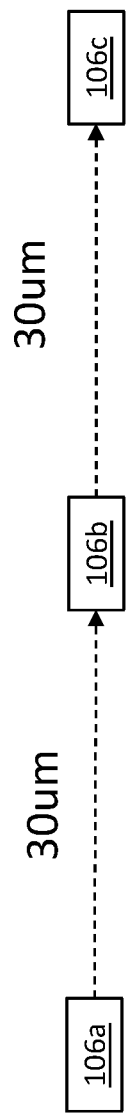
FIG. 5A
FIG. 5B

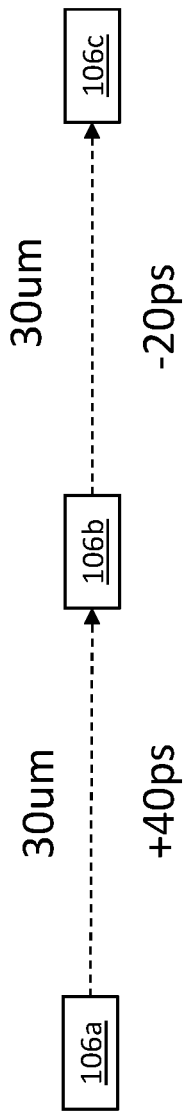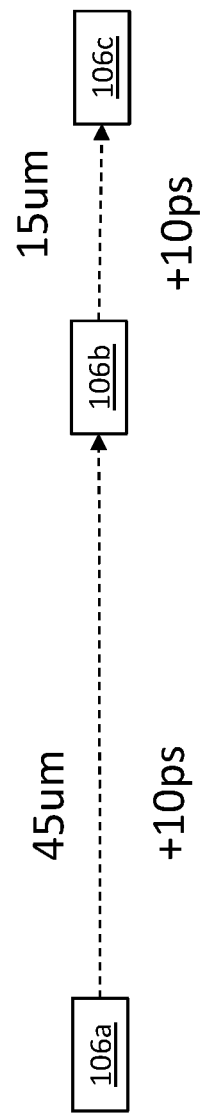
FIG. 5C
FIG. 5D

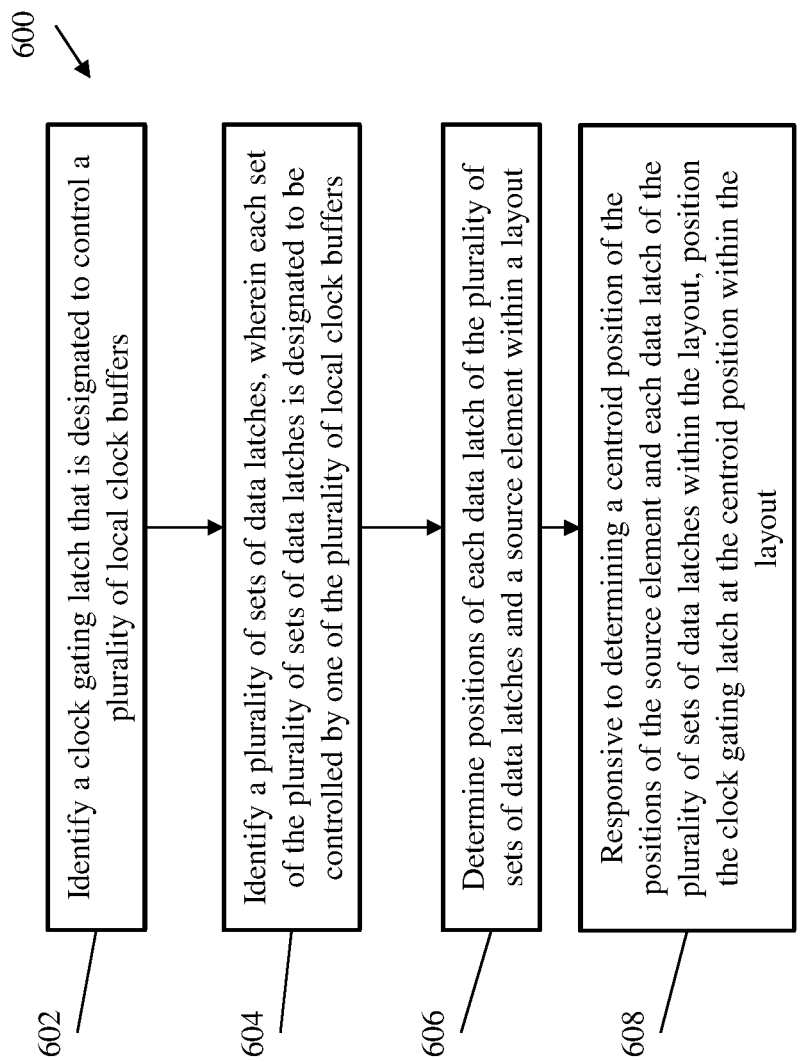

US 10,943,040 B1

CLOCK GATING LATCH PLACEMENT

BACKGROUND

The present invention generally relates to the fabrication and design of semiconductor chips and integrated circuits, and more specifically, to the improved placement of a clock gating latch.

A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. Cell placement in semiconductor fabrication involves a determination of where particular cells should optimally (or near-optimally) be located on the surface of an integrated circuit device. While various techniques provide adequate placement of cells with regard to their data interconnections, design consideration must also be given to constructing a clock network for the cells, which require a large amount of power. One method involves the use of local clock buffers (LCBs) to distribute the clock signals. Generally, a plurality of latches is controlled by each LCB and can be selectively turned on and off in response to signal sent to the LCB from a clock gating latch.

SUMMARY

Embodiments of the present invention are directed to providing improved placement of a clock gating latch. A non-limiting example of the computer-implemented method includes identifying a clock gating latch that is designated to control a local clock buffer. The method also includes determining a plurality of data latches that are designated to be controlled by the local clock buffer. The method also includes determining positions of the plurality of data latches within a layout. The method also includes determining a position of the clock gating latch within the layout based on the positions of the plurality of data latches within the layout.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A illustrates a plan view for a layout of an integrated circuit having a local clock buffer and latches including a clock gating latch placed in accordance with one or more embodiments of the present invention;

FIG. 2B illustrates a plan view for a layout of an integrated circuit including a clock gating latch and an local clock buffer placed in accordance with one or more embodiments of the present invention;

FIG. 5A depicts an example relative positioning of three latches in accordance with one or more embodiments of the present invention;

FIG. 5B depicts an example repositioning of the relative position of three latches to minimize net lengths in accordance with one or more embodiments of the present invention;

FIG. 5C depicts an example of signal timing between three latches in accordance with one or more embodiments of the present invention;

FIG. 5D depicts an example adjustment of the relative positioning of three latches to optimize signal timing in accordance with one or more embodiments of the present invention;

FIG. 6 illustrates a flow diagram of another process for improved placement of a clock gating latch in accordance with one or more embodiments of the present invention;

Figure 1:
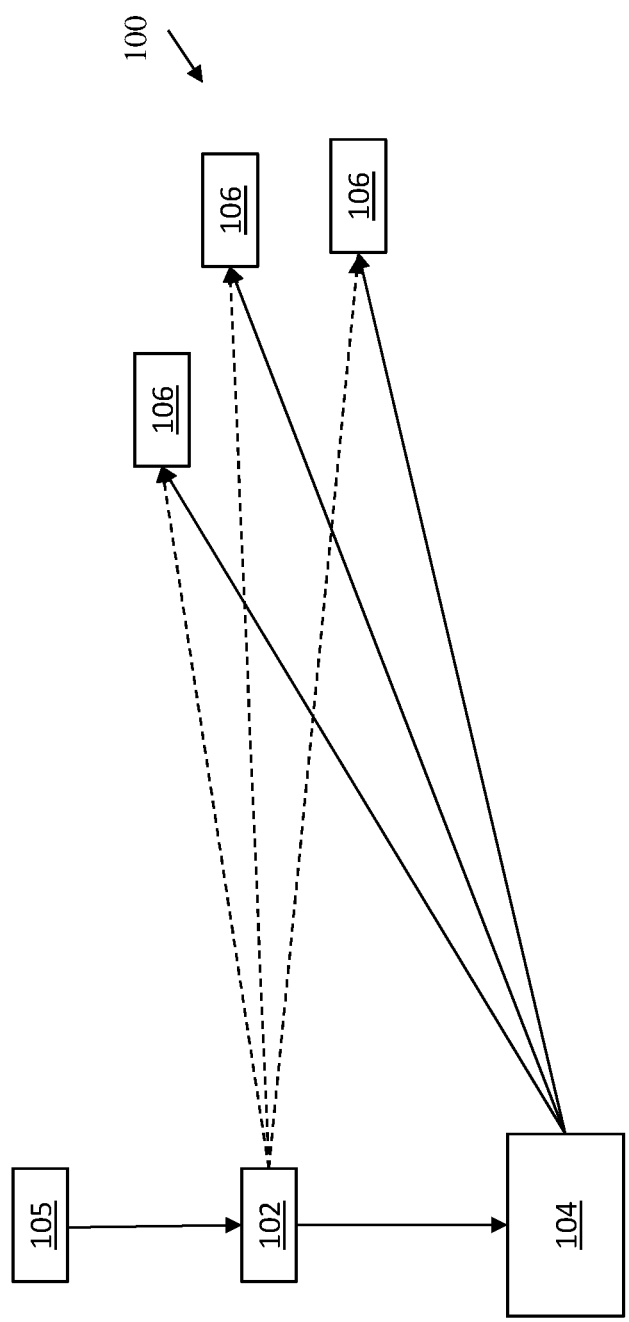
FIG. 1 illustrates a plan view for a layout of an integrated circuit having a local clock buffer and latches in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically, at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins. A layout typically includes a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools; and many phases have already been partially or fully automated. Automation of the physical design process has increased the level of integration, reduced turn around time and enhanced chip performance. Several different programming languages have been created for electronic design automation (EDA) including Verilog, very high speed integrated circuit hardware description language (VHDL) and time division multiplexing logic (TDML). A typical EDA system receives one or more high level behavioral descriptions of an IC device, and translates this high level design language description into netlists of various levels of abstraction.

While various techniques provide adequate placement of cells with regard to their data interconnections, there is an additional challenge for the designer in constructing a clock network for the cells, which requires a large amount of power. There are several techniques for minimizing power while still achieving timing objectives for high performance, low power systems. One method involves the use of local clock buffers (LCBs) to distribute the clock signals. A typical clock control system has a clock generation circuit (e.g., a phase-lock loop) that generates a master clock signal which is fed to a clock distribution network that renders synchronized global clock signals at the LCBs. Each LCB adjusts the global clock duty cycle and edges to meet the requirements of respective circuit elements, e.g., local logic circuits or latches (the term "latch" as used herein stands for any clocked element which is usually a sink of a clock distribution network). Since this clock network is one of the largest power consumers among all of the interconnects, it is further beneficial to control the capacitive load of the LCBs, each of which is driving a set of many clock sinks. One approach for reducing the capacitive load is latch clustering, i.e., clusters of latches placed near the respective LCB of their clock domain. Latch clustering combined with LCBs can significantly reduce the total dock wire capacitance which in turn reduces overall clock power consumption.

Since most of the latches are placed close to an LCB, clock skew is also reduced which helps improve the timing of the circuit.

Turning now to an overview of technologies that are more specifically relevant to aspects of the invention, when placing cells in a circuit layout it is generally desirable to attempt to optimize the placement of latches in relation to LCBs. Conventional methods of latch placement involve placing the latches based on timing characteristics and once placed, utilizing a shuddling mechanism that involves cloning and placing LCB's. The LCB receives a signal from a latch (which may be referred to as a "clock gating latch") that turns the clock on or off to save power at the other connected latches (which may be referred to as "data latches"). However, at the time the data latches are initially placed the placement of the LCB is unknown. The ultimate purpose of the clock gating latch is to gate the data latches that are controlled by the LCB, but it does this through the LCB which has not yet been placed. During initial latch placement, the latch that drives the LCB with this signal will need to be placed, but because the position of the LCB is unknown at this point it is not apparent where the clocking gating latch should be placed. This is problematic because the clock gating latch may not be placed near the location of the cloned LCB that controls the data latches, which can result in timing problems.

Turning now to an overview of the aspects of the invention, one or more embodiments of the invention address one or more of the above-described shortcomings of the prior art by disclosing methods and techniques for optimizing placement of clock gating latches that drive cloned LCBs and ultimately control the data latches. Such techniques involve identifying, during the initial latch placement, cases where the LCB has not yet been placed and a latch that drives the LCB needs to be placed and then "looking through" the uncloned LCB to see where the true sinks of the clock gating are and placing the latch based on the location of these sinks (i.e., data latches). The LCB can then later be cloned and moved towards the latches to further optimize the overall relative placements. This is advantageous because it can be achieved without performing multiple passes.

Turning now to a more detailed description of aspects of the present invention, FIG. 1 depicts a portion of a layout 100 of an integrated circuit having a clock gating a clock gating latch 102, a local clock buffer (LCB) 104, a source latch 105 and data latches 106 in accordance with one or more embodiments of the present invention. As shown in FIG. 1, the output of the source latch 105 to an input of the clock gating latch 102, the output of the clock gating latch 102 is connected as an input to the LCB 104 and outputs of the LCB 104 are respectively connected to each of the data latches 106. Although FIG. 1 depicts the clock gating latch 102 as having another latch as an input (i.e., source latch 105), those of skill in the art will understand that in various embodiments the clock gating latch 102 can have different types of circuit elements as inputs, such as for example but not limited to, a combinatorial logic gate (e.g., NAND, NOR, MUX, etc.) or a series of gates that logically control the clock gating signal itself. In accordance with this configuration, in addition to receiving an input signal via a net connected to the source latch 105, the clock gating latch 102 can control the LCB 104, which in turn can control the data latches 106. Thus, the true sinks of the clock gating latch 102 are the data latches 106. As indicated by the dotted lines in FIG. 1, clock gating latch 102 can identify its true sinks by "looking through" the LCB 104 to determine where the outputs of the LCB 104 lead. When "looking through" the LCB 104 in this manner, the clock gating latch 102 can be viewed as though it is directly connected to the data latches 106 (i.e., as though the LCB 104 doesn't exist). The clock gating latch 102 can be operative to selectively turn on and off all of the data latches 106 via the LCB 104 so that power can be conserved by turning off a group of data latches 106 when they are not being used. As described above, the LCB 104 may be a cloned LCB that may not have been positioned at the time of placement of the latches 102, 106, as the latches are conventionally placed/positioned within the layout 100 prior to the LCB 104. However, as shown in FIG. 1, this can result in a placement of the clock gating latch 102 in a position that is inefficient for timing purposes. As will be appreciated by those of skill in the art, a conventional latch placement routine may result in a situation where the clock gating latch 102 is far away from its true sinks (i.e., the data latches 106), which can cause timing problems. Conventional latch placement routines may result in placement of the clock gating latch 102 far from its true sinks because latches are conventionally placed based off of the connectivity and timing of the data signal coming in and the data signal going out and at the time of initial placement of the clock gating latch 102 the data signal feeding into the clock gating latch will be connected to logical gates and the data signal out will be connected to an LCB that has not been cloned and optimally placed. Because the LCB that connects to the output of the clock gating latch 102 is either unplaced or sub-optimally placed at the time of placement of the clock gating latch 102, conventionally, the initial placement of the clock gating latch will also not be optimal. For instance, in the example shown in FIG. 1, the LCB 104 may not have been placed at the time of initial placement of the clock gating latch 102, and as such the only connectivity data for the clock gating latch 102 that would be used to initially place the clock gating latch 102 would be its connection to the source latch 105, which results in an initial placement of the clock gating latch 102 close to the source latch 105 but potentially far away from the data latches 106.

FIGS. 2A and 2B depict a portion of a layout 200 of an integrated circuit where the clock gating latch has been placed in accordance with a method 400 for improved placement of a clock gating latch in accordance with one or more embodiments of the present invention, and as described in greater detail below with respect to FIG. 4. In some embodiments, the layout 200 (e.g., a circuit layout or semiconductor layout) can be generated using the computer system 300 shown in FIG. 3. Although only a portion of a semiconductor layout is shown in FIGS. 1, 2A and 2B, those of skill in the art will recognize that a semiconductor layout may be made up of macro blocks having rows that are occupied by various cells (with each cell containing one or more transistors) that provides a useful layer of hierarchical abstraction for designing an integrated circuit that may contain billions of transistors. The computer system 300 has one or more software applications 302 configured to function and implement operations as discussed herein. For example, software applications 302 may include one or more placement routines for placing clock gating latches 102, local clock buffers 104, data latches 106 and source latches 106 (or other circuit elements that are inputs to the clock gating latch 102) in a manner resulting in a semiconductor layout 200 in which the clock gating latch 102 is placed based on the locations of its sinks (i.e., data latches 106) that are ultimately controlled by the clock gating latch 102. As shown in FIG. 2B, in some embodiments, software applications 302 can include one or more routines for placing repositioning the LCB 106 relative to the data latches 106 following the placement of the clock gating latch 102. According to some embodiments, software applications 302 can provide other place and fill routines for placing functional cells and fill cells in order to complete a semiconductor layout. A semiconductor layout 200 can be constructed by the software application 302 of the computer 300 to build the semiconductor device (e.g., an integrated circuit). The computer 300 can be configured guarantee design rule cleanliness (i.e., pass) for a semiconductor device before and/or without requiring a design rule check.

Figure 3:
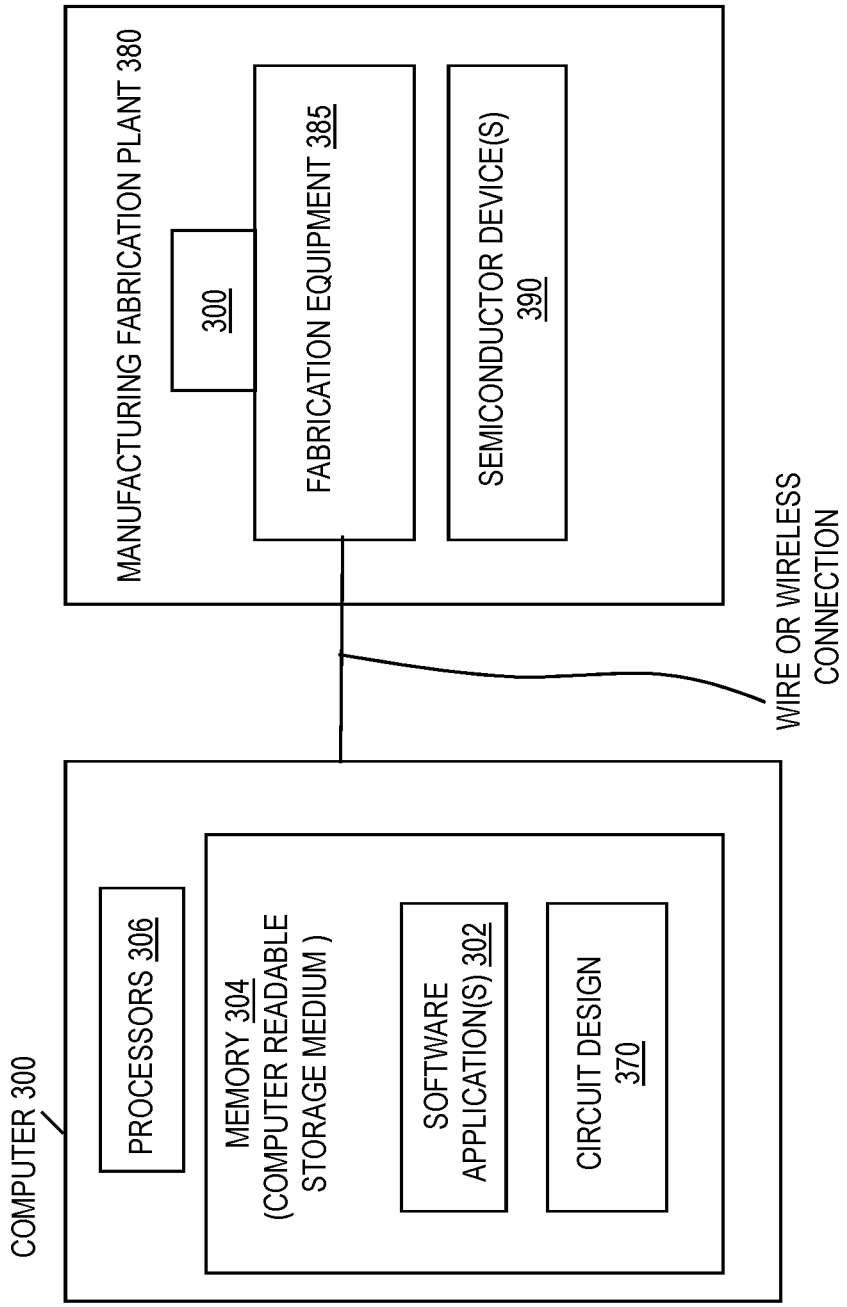
FIG. 3 depicts a system of a computer system integrated with a manufacturing fabrication plant according to one or more embodiments of the invention.

The software applications 302 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 300 is coupled to, integrated with, and/or part of the fabrication equipment 385 at the manufacturing fabrication plant 380 (so as to communicate with and/or control operations of the fabrication equipment 385) to thereby fabricate semiconductor device(s) 390 as depicted in FIG. 3, as understood by one skilled in the art. The computer 300 includes one or processors 306 configured to execute one or more software applications 302 in memory 304. The computer 300 receives input of a design 370 for the semiconductor device 390, and the computer 300 is configured to develop/form the semiconductor layout 200 for the semiconductor device in order to build the semiconductor device. The semiconductor layout 200 is a physical design released to the manufacturing fabrication (Fab) plant 380 and physically fabricated by the fabrication equipment 385 to produce the semiconductor device 390. The manufacturing fabrication plant 380 builds the photo mask from the semiconductor layout 200 as a physical design, and then builds the actual product using the photo mask. The product is an integrated circuit (i.e., semiconductor device 390) on a wafer according to the semiconductor layout 200 (physical design). There may be numerous integrated circuits on a wafer, and each integrated circuit may be diced into an individual chip.

Figure 4:
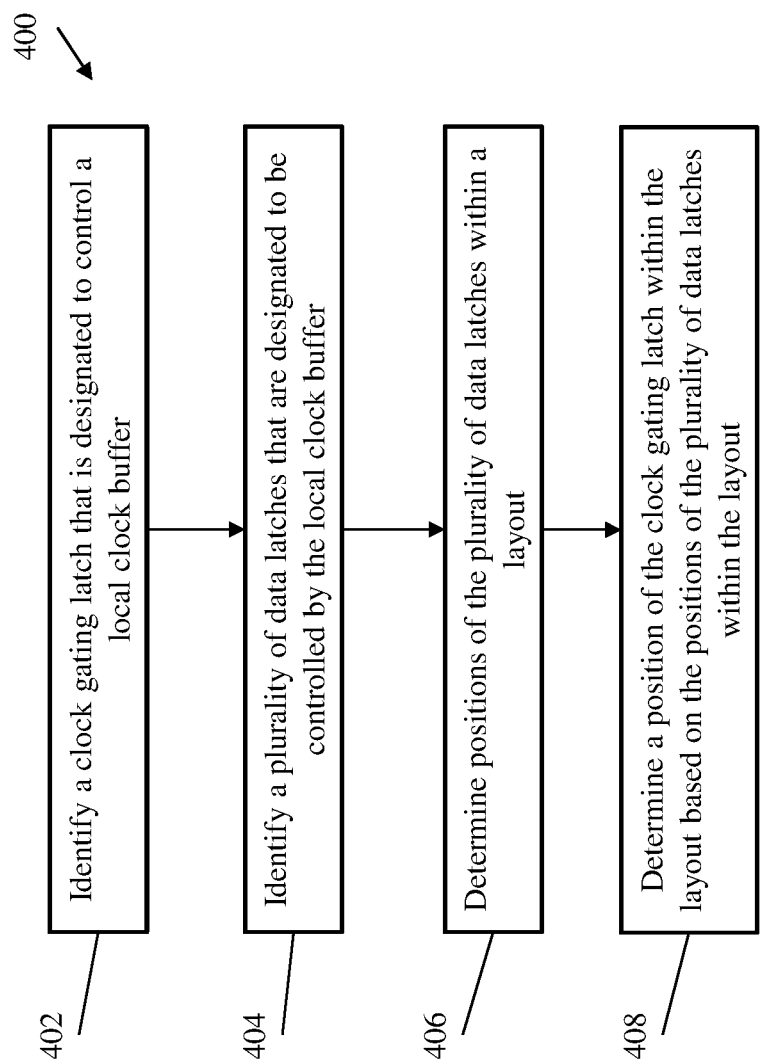
FIG. 4 illustrates a flow diagram of a process for improved placement of a clock gating latch in accordance with one or more embodiments of the present invention.

Turning now to FIG. 4, a flow diagram of a method for improved placement of a clock gating latch is generally shown in accordance with one or more embodiments of the present invention. In one or more embodiments of the present invention, the method 400 may be embodied in software that is executed by elements of computer 300 illustrated in FIG. 3, embodied in software that is executed by computer elements located within a network that may reside in the cloud, such as the cloud computing environment 50 described herein above and illustrated in FIGS. 6 and 7. In other embodiments, the computer elements may reside on a computer system or processing system, such as the processing system 800 described herein above and illustrated in FIG. 8, or in some other type of computing or processing environment.

The method 400 begins at block 402 and includes identifying (e.g., via computer 300) a clock gating latch (e.g., latch 102) that is designated to control a local clock buffer (e.g., LCB 104). According to some embodiments, identifying the clock gating latch can include identifying a latch that has an output pin that is designated to connect to a specified input pin of the local clock buffer based what is connected to a specified pin on the LCB (e.g., as indicated by pin connections listed in a netlist) at the time of placement. As will be understood by those of skill in the art, a netlist may be a list of circuit elements that specifies which elements should be connected together and which pins the connections should occur at. An LCB may be configured to use a specified pin as to receive an input from a clock gating latch, and thus the latch that is designated to connect to this input pin of the LCB may be considered to be a clock gating latch. A netlist is a record of all of the nets, or interconnections, between the cell pins. In other words, for a given LCB provided in the netlist, the system may lookup the pin connections of the LCB and determine that a particular latch is connected to a particular input pin of the LCB and may designate this latch as being the clock gating latch. As described previously above, the clock gating latch can be configured to control a power supply to the plurality of data latches (e.g., data latches 106) via the LCB. As will be understood by those of skill in the art, during operation the clock gating latch can power down the plurality of data latches when they are not being used to preserve power.

As shown at block 404, the method includes identifying (e.g., via computer 300) a plurality of data latches that are designated to be controlled by the local clock buffer. These data latches can be identified in a similar manner to the identification of the clock gating latch by referencing the netlist. In other words, according to some embodiments, identifying a plurality of data latches that are designated to be controlled by the local clock buffer can include identifying a plurality of latches that have input pins that are designated to connect to output pins of the local clock buffer based on the netlist. In this way, the system can "see through" the LCB to determine what the sinks of the clock gating latch are.

As shown at block 406, the method includes determining (e.g., via computer 300) positions of the plurality of data latches within a layout. In some embodiments of the invention, determining positions of the plurality of data latches within a layout can be achieved using conventional techniques, such as positioning data latches based on minimizing wire length on the data input and output nets while maintaining timing requirements. For example, FIGS. 5A through 5D depict an example placement of data latches. FIG. 5A shows an initial placement of a first data latch 106a, a second data latch 106b and a third data latch 106c relative to one another, with the second data latch 106b having nets of 40 um between both the first data latch 106a and the third data latch 106c. FIG. 5B shows that the net length can be minimized by repositioning the second data latch 106b such that the nets between the second data latch 106b and each of the first data latch 106a and the third data latch 106c are reduced to 30 um each. FIG. 5C shows that the timing between the first data latch 106a and the second data latch 106b is +40 ps (indicating that the path passes timing requirements by 40 ps) and the timing between the second data latch 106b and the third data latch 106c is −20 ps (indicating that the path fails timing requirements by 20 ps), based on the repositioning of the second data latch 106b that occurred in FIG. 5B. FIG. 5D shows that the second data latch 106b can be adjust again to now optimize timing (without changing the overall net length) by being moved to a position that results in timing of +10 ps between each of the legs of the circuit. According to some embodiments, repositioning one or more latches to optimize timing may include repositioning one or more latches such that path/leg is positive (i.e., passes timing requirements), and preferably that each path/leg are equivalent (e.g., each leg is +10 ps). As will be understood by those of skill in the art, this is generally an iterative process in which each latch can be analyzed and placed in a serial fashion. The process may generally be repeated multiple times to anneal to the optimal solution for the placement of the data latches 106.

As shown at block 408, the method includes determining (e.g., via computer 300) a position of the clock gating latch (e.g., latch 102) within the layout based on the positions of the plurality of data latches (e.g., latches 106) within the layout. In some embodiments, determining a position of the clock gating latch based on the positions of the plurality of data latches within the layout can include determining a centroid position of the plurality of data latches within the layout and designating the centroid position as the position of the clock gating latch. In some embodiments, determining the position of the clock gating latch based on the positions of the plurality of data latches within the layout can include placing the clock gating latch based on process, similar to that illustrated previously with respect to FIGS. 5A through 5D, that treats the data latches as sinks of the clock gating latch (i.e., ignores the intermediate LCB) and minimizes the theoretical net length between the clock gating latch and its connected source and sinks (e.g., in a manner similar to that shown in FIGS. 5A and 5B) and can optimize the timing between them (e.g., in a manner similar to that shown in FIGS. 5C and 5D). Although the clock gating latch is not directly connected to the data latches, it may be treated as such for the purpose of determining the location of the clock gating latch based on the positions of the data latches and the source. Thus, in some embodiments, determining a position of the clock gating latch based on the positions of the plurality of data latches within the layout can include determining a source position of a source of the clock gating latch (e.g., a source latch) within the layout, determining a net-minimizing position within the layout that has a minimum collective distance to each of the source position and the positions of the plurality of data latches (e.g., in a manner similar to that shown in FIG. 2A) and designating the net-minimizing position as the position of the clock gating latch. Accordingly, in some embodiments, the clock gating latch can be positioned at a location that is designed to minimize the total distance between the clock gating latch and (1) the source (e.g., source latch 105 shown in FIG. 2A) and (2) each of the data latches that are sinks of the clock gating latch (e.g., data latches 106 shown in FIG. 2A). In some embodiments, the position of the clock gating latch (e.g., as shown in FIG. 2B) may be further adjusted to optimize the timing characteristics of the circuit in a manner similar to that shown in FIGS. 5C and 5D. According to some embodiments, adjusting the position of the clock gating latch to optimize the timing characteristics of the circuit may occur following the final placement of the LCB or cloned LCB.

FIG. 2A shows an example placement of the clock gating latch 102 in accordance with method 400. As shown in FIG. 2A, the clock gating latch 102 can be placed at a location that is proximate (or closer to) the group of data latches 106 that are the sinks of the clock gating latch (i.e., that are to be connected to the cloned LCB 104 that is controlled by the clock gating latch 102) following the determination of the position of the clock gating latch 102 as described above. As will be appreciated by those of skill in the art, the LCB 104 will conventionally be initially placed after the placement of the latches 102, 105, 106 and then can be moved to a location that is more central to the data latches 106 to which the LCB 104 is connected to via output nets. In some embodiments, the data latches 106 can be shuddled around the LCB 104 to further reduce the length of the nets (i.e., wiring) between them. For example, FIG. 2B shows an example of a repositioning of the LCB 104 to a location proximate the data latches 106 (e.g., to a central or an approximately centroid position of the data latches 106) along with a shuddling of the data latches 106 around the LCB 104 (i.e., adjusting the positions of the data latches 106 so they are very near to the LCB 104). The example shown in FIG. 2B depicts the final positioning of the latches 102, 105, 106 and LCB 104 in accordance with the method 400. As shown, following the steps of method 400 can result in the overall length of the nets (i.e., the connections between the various latches and the LCB) being minimized and the timing characteristics of the layout 200 being improved or optimized (e.g., by repositioning one or more elements up or down their route (i.e. to a new position along the path of the connected net) based on timing measurements in a manner similar to that shown in FIGS. 5C and 5D).

In some embodiments, the method 400 can further include positioning the local clock buffer based on the positions of the plurality of data latches within the layout. For example, as explained above, the LCB may be moved to an approximately central or centroid location relative to the data latches to attempt to minimize the length of the nets and improve circuit timing. In some embodiments, the system may position the LCB to minimize a total net length between the local clock buffer and each of the plurality of data latches without regard to the position of the clock gating latch. According to some embodiments, after cloning (i.e., after creation of this particular instance of the LCB), the LCB can be positioned at a central location among the data latches it controls and then those latches are clustered around the LCB, as described above with respect to FIG. 2B.

According to some embodiments, the method 400 can further include determining that a total number of the plurality of data latches exceeds a threshold number and cloning the LCB to create at least one cloned LCB. As will be appreciated by those of skill in the art, a LCB may be physically limited in the number of latches it can control. Thus, if a netlist indicates that an LCB is connected via output pins to 100 data latches, but the maximum number of latches that can be controlled a given LCB is 20, then it may be necessary to clone the LCB a number of times (i.e., to generate at least 5 instances of the LCB in this case) to accommodate the number of latches that are designated to be controlled by it. In some embodiments, the method may further include positioning the LCB based on the positions of a first subset of the plurality of data latches within the layout and positioning the cloned LCB based on the positions of a second subset of the plurality of data latches within the layout. The first subset of the plurality of data latches can be controlled by (i.e., connected as outputs to) the LCB and the second subset of the plurality of data latches can be controlled by the cloned LCB. In other words, if the netlist indicates that a given LCB is designated to control more than the maximum amount of data latches that a single LCB can handle, then the system may clone the LCB and identify a plurality of groups of data latches that are each controlled by a cloned LCB. Each cloned LCB may then be independently positioned within the layout based on the locations of the data latches that are in the corresponding group of latches (i.e., the group of latches that are connected as outputs to each respective cloned LCB).

According to some embodiments, a clock gating latch may be designated to control more than one LCB (e.g., as indicated by the netlist). Each LCB may control its own respective set of data latches. In such a case, according to some embodiments, the position of the clock gating latch can be determined based on the positions of all of the data latches of the respective set of latches. For example, in some embodiments, the clock gating latch may be positioned at the centroid location of all of the latches of the combined respective sets of latches, but the corresponding cloned LCB's may be positioned based on a single respective set of data latches. In some embodiments, the clock gating latch may be positioned based on minimizing the overall net lengths between the clock gating latch and (1) a input element (such as source latch 105 in FIG. 2A) and (2) all of the latches of the combined respective sets of data latches (when "seeing through" the LCBs to view the data latches as the true sinks of the clock gating latch) and if necessary, adjusting the position of the clock gating latch to optimize timing between the clock gating latch and the data latches (i.e., in a process similar to that shown in FIGS. 5A through 5D) and then positioning the corresponding cloned LCB's based on a single respective set of data latches (i.e., positioning each LCB/cloned LCB relative to its connected data latches in a process similar to that shown in FIG. 2B). According to some embodiments, the position of the clock gating latch does not affect the placement of any LCB (or cloned LCB).

Turning now to FIG. 6, a flow diagram of another method 600 for improved placement of a clock gating latch in accordance with an embodiment is shown in accordance with one or more embodiments of the present invention. In one or more embodiments of the present invention, the method 600 may be embodied in software that is executed by elements of computer 300 illustrated in FIG. 3, embodied in software that is executed by computer elements located within a network that may reside in the cloud, such as the cloud computing environment 50 described herein above and illustrated in FIGS. 7 and 8. In other embodiments, the computer elements may reside on a computer system or processing system, such as the processing system 900 described herein above and illustrated in FIG. 9, or in some other type of computing or processing environment.

The method 600 begins at block 602 and includes identifying (e.g., via computer 300) a clock gating latch that is designed to control a plurality of local clock buffers. The clock gating latch can be identified, for example, by examining the pin connections between the LCB's and the clock gating latch as recorded in a stored netlist. Further, a source element that provides an input signal to the clock gating latch can also be identified by examining pin connections between the clock gating latch and the source element.

As shown at block 604, the method includes identifying (e.g., via computer 300) a plurality of sets of data latches (e.g., based on a netlist), wherein each set of the plurality of sets of data latches is designated to be controlled by one of the plurality of local clock buffers. For example, each set of data latches can be identified by identifying which data latches are connected as outputs to a given LCB (e.g., via viewing pin connections in a stored netlist).

As shown at block 606, the method includes determining (e.g., via computer 300) positions of each data latch of the plurality of sets of data latches and the source element within a layout (e.g., a circuit layout or a semiconductor layout). According to some embodiments, the positions can be 2-dimensional coordinates within a circuit layout.

As shown at block 608, the method includes responsive to determining a centroid position of the positions of the source element along with each data latch of the plurality of sets of data latches and the within the layout, positioning (e.g., via computer 300) the clock gating latch at the centroid position within the layout. Alternatively, the clock gating latch can be positioned at a location that minimizes the collective overall net length between the clock gating latch and (1) the source element and (2) each data latch of the plurality of sets of data latches, and optionally optimizes timing between the connections (e.g., in a manner similar to that described above with respect to FIGS. 5A-5D).

The method can also include positioning each of the local clock buffers (or cloned LCBs) at a location that is central to the corresponding set of data latches of the plurality of sets of data latches (i.e., to the set of data latches that are designated as being connected as outputs to the LCB). In this way, even though the clock gating latch controls multiple different LCB's, it can be positioned centrally to all of the data latches that are the true sinks of the clock gating latch, and each of the LCB's can be moved to a position that is near its respective group of data latches that it controls to improve overall timing characteristics of the circuit. Each of the plurality of sets of data latches can be shuddled around its respective LCB to further reduce net length and improve timing characteristics.

Additional processes may also be included. It should be understood that the processes depicted in FIGS. 4 and 6 represent illustrations, and that other processes may be added or existing processes may be removed, modified, or rearranged without departing from the scope and spirit of the present disclosure.

Figure 7:
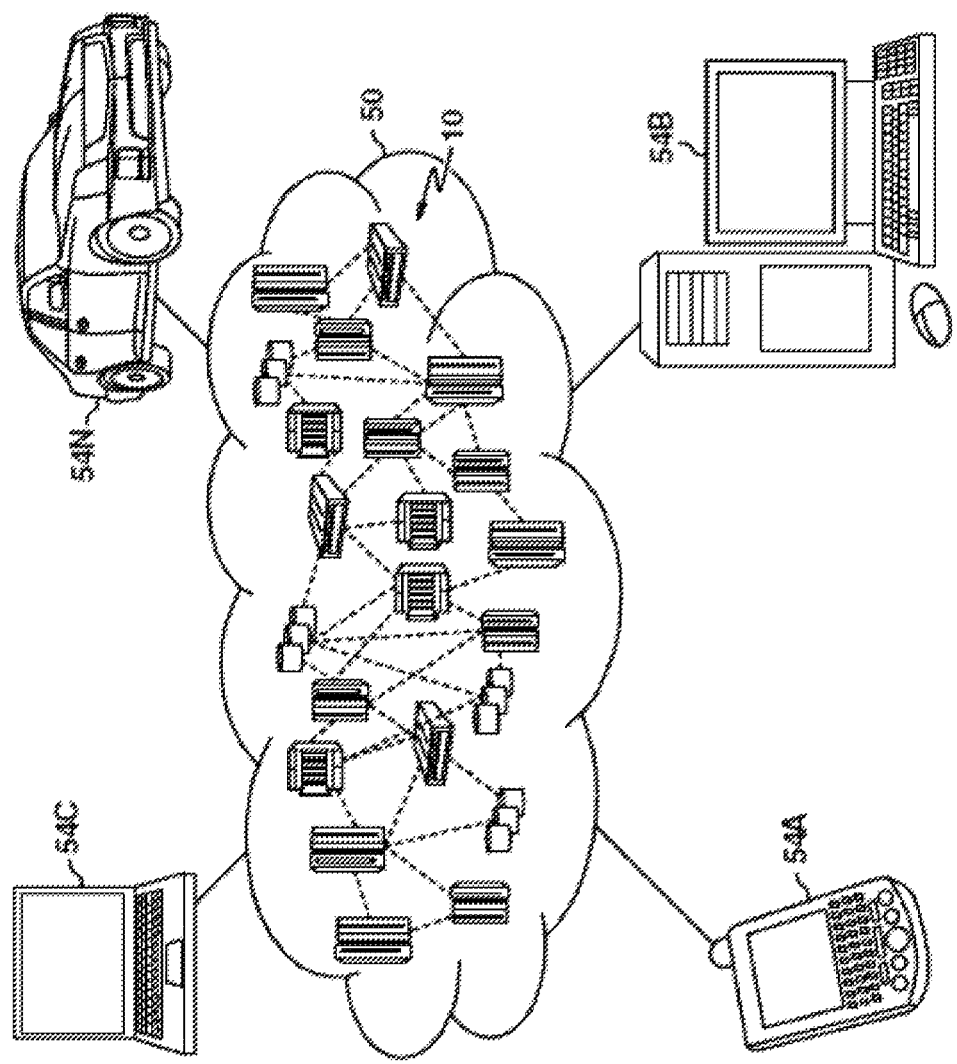
FIG. 7 illustrates a cloud computing environment according to one or more embodiments of the present invention.
Figure 8:
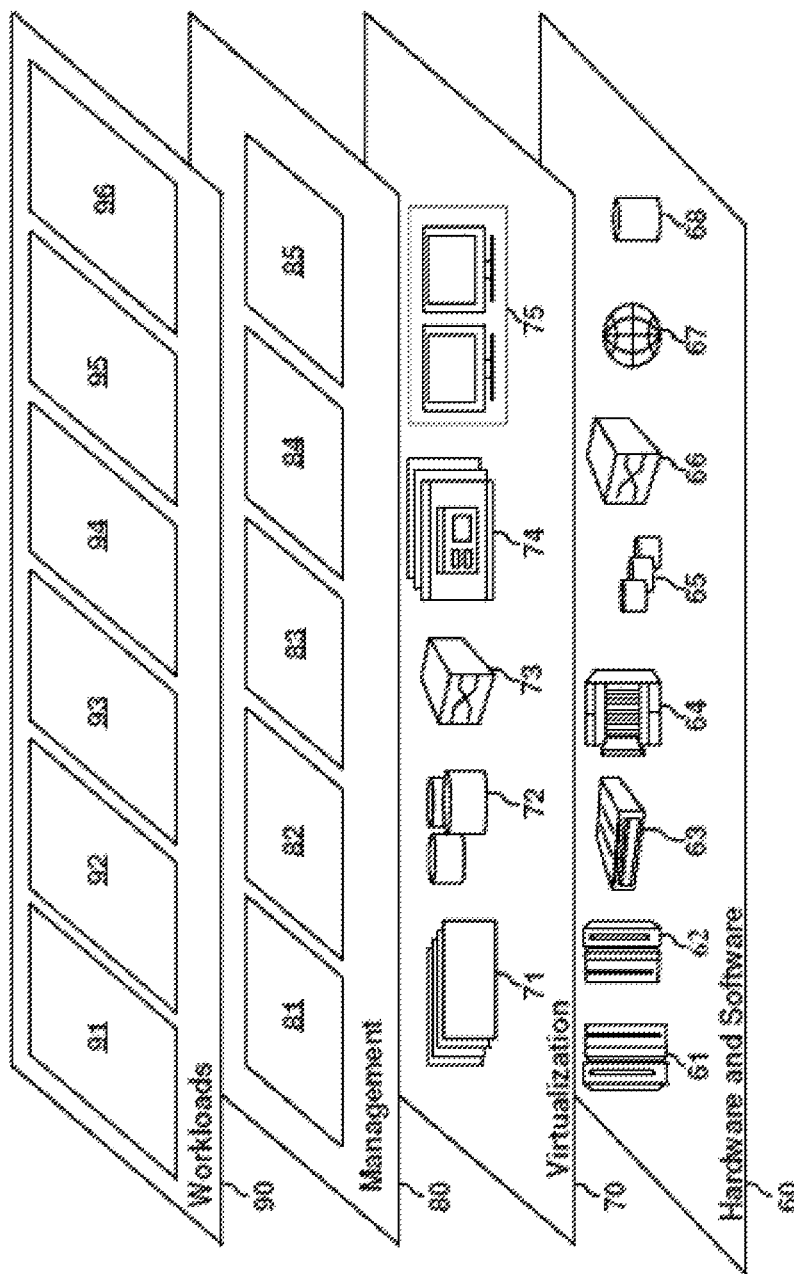
FIG. 8 illustrates abstraction model layers according to one or more embodiments of the present invention.

FIG. 7 depicts a cloud computing environment according to one or more embodiments of the present invention. FIG. 8 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improved placement of a clock gating latch 96.

Figure 9:
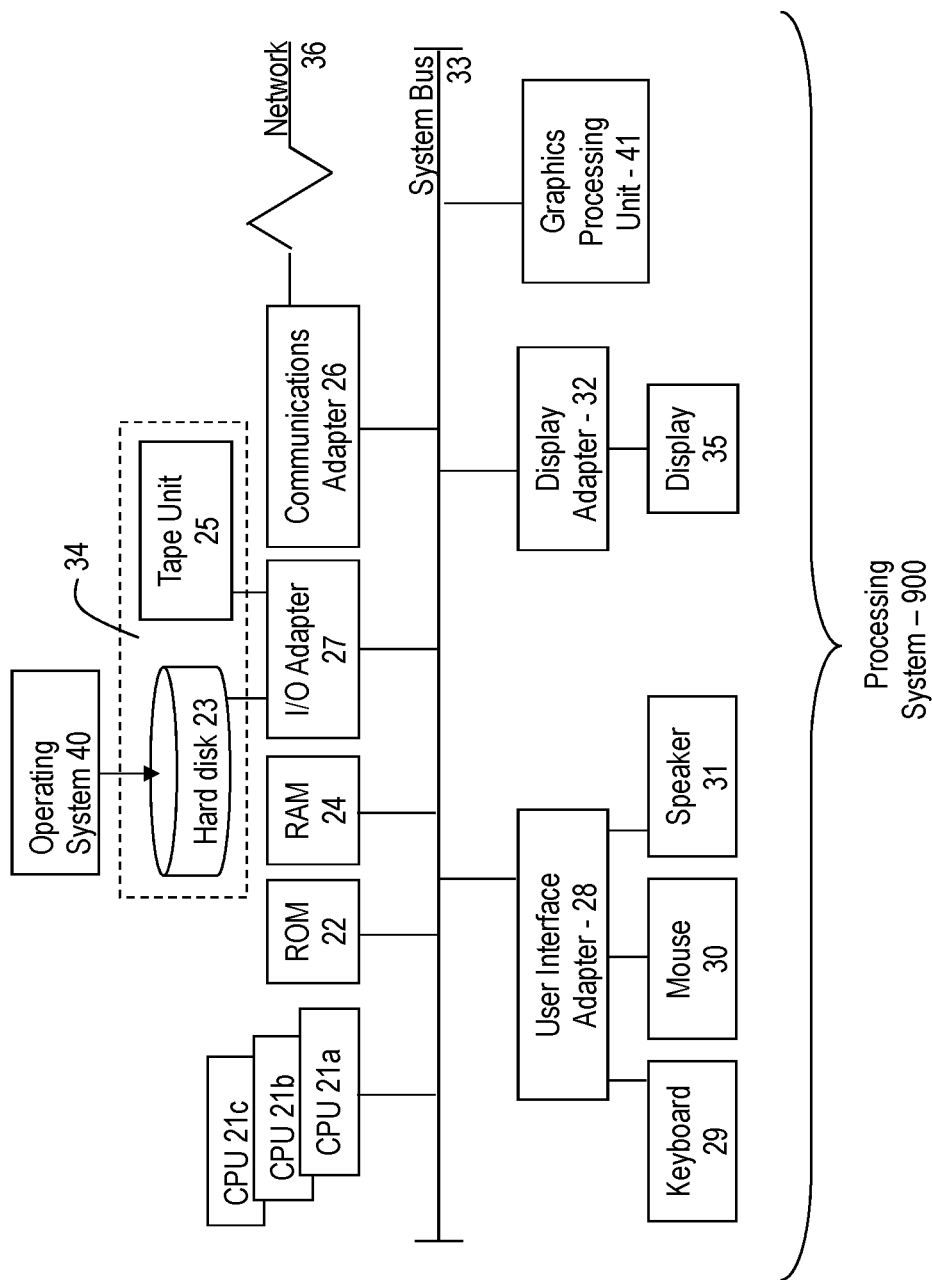
FIG. 9 illustrates a block diagram of a computer system for use in implementing one or more embodiments of the present invention.

FIG. 9 depicts a processing system for implementing one or more embodiments of the present invention. It is understood that one or more embodiments of the present invention are capable of being implemented in conjunction with any other type of computing environment now known or later developed. For example, FIG. 9 depicts a block diagram of a processing system 900 for implementing the techniques described herein. In accordance with one or more embodiments of the present invention, computer 300 and/or system 900 can be examples of a cloud computing node 10 of FIG. 7. In the embodiment shown in FIG. 9, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. The RAM 24, ROM 22, and mass storage 34 are examples of memory 19 of the processing system 900. A network adapter 26 interconnects system bus 33 with an outside network 36 enabling the processing system 800 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 800 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   identifying a clock gating latch that is designated to control a local clock buffer;
   identifying a plurality of data latches that are designated to be controlled by the local clock buffer;
   determining positions of the plurality of data latches within a layout, wherein the determining positions of the plurality of data latches within a layout comprises positioning data latches of the plurality of data latches based on timing constraints; and
   determining a position of the clock gating latch within the layout based on the positions of the plurality of data latches within the layout.

2. The computer-implemented method of claim 1, wherein the identifying a clock gating latch comprises identifying, based on a netlist, a latch that has an output pin that is designated to connect to a specified input pin of the local clock buffer.

3. The computer-implemented method of claim 1, wherein the identifying a plurality of data latches that are designated to be controlled by the local clock buffer comprises identifying, based on a netlist, a plurality of data latches that have input pins that are designated to connect to output pins of the local clock buffer.

4. The computer-implemented method of claim 1, wherein the determining a position of the clock gating latch based on the positions of the plurality of data latches within the layout comprises:
   determining a source position of an input source to the clock gating latch within the layout;
   determining a net-minimizing position within the layout that has a minimum collective distance to each of the source position and the positions of the plurality of data latches; and
   designating the net-minimizing position as the position of the clock gating latch.

5. The computer-implemented method of claim 1 further comprising:
   positioning the local clock buffer based on the positions of the plurality of data latches within the layout.

6. The computer-implemented method of claim 5, wherein the local clock buffer is positioned to minimize a total distance between the local clock buffer and each data latch of the plurality of data latches.

7. The computer-implemented method of claim 1 further comprising:
   determining that a total number of the plurality of data latches exceeds a threshold number; and
   cloning the local clock buffer to create at least one cloned local clock buffer.

8. The computer-implemented method of claim 7 further comprising:
   positioning the local clock buffer based on the positions of a first subset of the plurality of data latches within the layout, wherein the first subset of the plurality of data latches are controlled by the local clock buffer; and
   positioning the cloned local clock buffer based on the positions of a second subset of the plurality of data latches within the layout, wherein the second subset of the plurality of data latches are controlled by the cloned local clock buffer.

9. The computer-implemented method of claim 1, wherein the clock gating latch is configured to control a power supply to the plurality of data latches.

10. A system comprising:
    a memory having computer readable instructions; and
    one or more processors for executing the computer readable instructions, the computer readable instructions controlling the one or more processors to perform operations comprising:
      identifying a clock gating latch that is designated to control a local clock buffer;
      identifying a plurality of data latches that are designated to be controlled by the local clock buffer;
      determining positions of the plurality of data latches within a layout, wherein the determining positions of the plurality of data latches within a layout comprises positioning data latches of the plurality of data latches based on timing constraints; and
      determining a position of the clock gating latch within the layout based on the positions of the plurality of data latches within the layout.

11. The system of claim 10, wherein the identifying a clock gating latch comprises identifying, based on a netlist, a latch that has an output pin that is designated to connect to a specified input pin of the local clock buffer.

12. The system of claim 10, wherein the identifying a plurality of data latches that are designated to be controlled by the local clock buffer comprises identifying, based on a netlist, a plurality of latches that have input pins that are designated to connect to output pins of the local clock buffer.

13. The system of claim 10, wherein the determining a position of the clock gating latch based on the positions of the plurality of data latches within the layout comprises:
- determining a source position of an input source to the clock gating latch within the layout;
- determining a net-minimizing position within the layout that has a minimum collective distance to each of the source position and the positions of the plurality of data latches; and
- designating the net-minimizing position as the position of the clock gating latch.

14. The system of claim 10, the operations further comprising:
- positioning the local clock buffer based on the positions of the plurality of data latches within the layout.

15. The system of claim 14, wherein the local clock buffer is positioned to minimize a total distance between the local clock buffer and each data latch of the plurality of data latches.

16. A computer program product comprising a non-transitory computer readable storage medium having program instructions embodied therewith, the program instructions executable by a computer processor to cause the computer processor to perform a method comprising:
- identifying a clock gating latch that is designated to control a local clock buffer;
- identifying a plurality of data latches that are designated to be controlled by the local clock buffer;
- determining positions of the plurality of data latches within a layout, wherein the determining positions of the plurality of data latches within a layout comprises positioning data latches of the plurality of data latches based on timing constraints; and
- determining a position of the clock gating latch within the layout based on the positions of the plurality of data latches within the layout.

17. The computer program product of claim 16, wherein the identifying a clock gating latch comprises identifying, based on a netlist, a latch that has an output pin that is designated to connect to a specified input pin of the local clock buffer.

18. The computer program product of claim 16, wherein the identifying a plurality of data latches that are designated to be controlled by the local clock buffer comprises identifying, based on a netlist, a plurality of latches that have input pins that are designated to connect to output pins of the local clock buffer.

19. The computer program product of claim 16, wherein the determining a position of the clock gating latch based on the positions of the plurality of data latches within the layout comprises:
- determining a source position of a source of the clock gating latch within the layout;
- determining a net-minimizing position within the layout that has a minimum collective distance to each of the source position and the positions of the plurality of data latches; and
- designating the net-minimizing position as the position of the clock gating latch.

20. The computer program product of claim 16, wherein the program instructions executable by the computer processor cause the computer processor to perform:
- determining that a total number of the plurality of data latches exceeds a threshold number; and
- cloning the local clock buffer to create at least one cloned local clock buffer.

* * * * *